(12) United States Patent
Zhou

(10) Patent No.: US 11,252,135 B2
(45) Date of Patent: Feb. 15, 2022

(54) METHOD OF PROCESSING DATA

(71) Applicant: Xingchang Zhou, Huai'an (CN)

(72) Inventor: Xingchang Zhou, Huai'an (CN)

( * ) Notice: Subject to any disclaimer, the term of this patent is extended or adjusted under 35 U.S.C. 154(b) by 0 days.

(21) Appl. No.: 16/941,683

(22) Filed: Jul. 29, 2020

(65) Prior Publication Data

US 2020/0358747 A1 Nov. 12, 2020

Related U.S. Application Data

(63) Continuation of application No. PCT/CN2019/072448, filed on Jan. 19, 2019.

(30) Foreign Application Priority Data

Feb. 1, 2018 (CN) .......................... 201810108885.5

(51) Int. Cl.
| | | |
|---|---|---|
| *H04L 29/06* | (2006.01) | |
| *G06F 3/14* | (2006.01) | |
| *G06F 21/62* | (2013.01) | |
| *H04L 29/08* | (2006.01) | |

(52) U.S. Cl.
CPC ........ *H04L 63/0428* (2013.01); *G06F 3/1431* (2013.01); *G06F 21/6245* (2013.01); *H04L 63/1441* (2013.01); *H04L 67/02* (2013.01)

(58) Field of Classification Search
CPC . H04L 63/0428; H04L 63/1441; H04L 67/02; H04L 63/0861; H04L 63/08; G06F 3/1431; G06F 21/32; G06F 21/34; G06F 21/31; H04W 12/06; H04W 12/77; G06Q 20/40145; G06Q 20/3276

See application file for complete search history.

(56) References Cited

U.S. PATENT DOCUMENTS

| | | | |
|---|---|---|---|
| 6,631,479 B1 | 10/2003 | Nishimura | |
| 8,924,712 B2 * | 12/2014 | Varadarajan | .......... H04L 9/3234 |
| | | | 713/155 |
| 9,479,499 B2 * | 10/2016 | Wang | .................. H04L 63/0853 |

(Continued)

FOREIGN PATENT DOCUMENTS

| | | | |
|---|---|---|---|
| CN | 103237266 A | 8/2013 | |
| CN | 103716652 A | 4/2014 | |
| WO | WO-2013043534 A1 * | 3/2013 | ............. G06Q 20/40 |

OTHER PUBLICATIONS

Internation Search Report of PCT/CN2019/072448, dated Apr. 17, 2019.

*Primary Examiner* — Chirag R Patel

(57) ABSTRACT

The present invention discloses a method of processing data, comprising: sending, a first data to a first image capturing device, by the first computer, through an image output interface of the first computer; sending, the first data to the second computer, by the first image capturing device. The first data comprises a first information and a second information, the second data comprises a third information and a forth information. The second computer processes the third data or the forth data by a first method if the third information is consistent with the first information and the forth information is consistent with the second information; and the second computer processes the third data or the forth data by a second method if the third information is inconsistent with the first information and the forth information is inconsistent with the second information.

5 Claims, 4 Drawing Sheets

(56) References Cited

U.S. PATENT DOCUMENTS

| | | | |
|---|---|---|---|
| 10,484,376 B1* | 11/2019 | Laucius | G06F 21/64 |
| 10,701,075 B2* | 6/2020 | Agarwal | G06T 19/006 |
| 10,708,257 B2* | 7/2020 | Dorfman | H04L 63/0823 |
| 2012/0159606 A1* | 6/2012 | Sobolewski | H04L 63/145 |
| | | | 726/12 |
| 2013/0219479 A1* | 8/2013 | DeSoto | G06Q 20/3276 |
| | | | 726/6 |
| 2016/0373428 A1* | 12/2016 | Shi | H04W 12/06 |
| 2018/0302379 A1 | 10/2018 | Zhou | |
| 2019/0243348 A1 | 8/2019 | Naohara et al. | |

\* cited by examiner

Sending, a first data to a first image capturing device, by the first computer, through an image output interface of the first computer; sending, the first data to the second computer, by the first image capturing device; or processing the first data, by the first image capturing device, and generating a second data; and sending the second data, by the first image capturing device, to the second computer.

Wherein the first image capturing device has an image input interface configured to be communicated with the image output interface of the first computer; the first data comprises a first information and a second information; the image output interface of the first computer comprises an output interface of a graphics card of the first computer.

S10

Sending, a third data to the first image capturing device, by the first computer, through the image output interface of the first computer after the first data or the second data is processed by the second computer; and sending, the third data, by the first image capturing device, to the second computer by the first image capturing device; or processing the third data, by the first image capturing device, and generating a forth data; and sending the forth data, by the first image capturing device, to the second computer.

S20 the third data or the forth data comprises a third information and a forth information; the second computer processes the third data or the forth data by a first method if the third information is consistent with the first information and the forth information is consistent with the second information; and the second computer processes the third data or the forth data by a second method if the third information is inconsistent with the first information and the forth information is inconsistent with the second information.

METHOD OF PROCESSING DATA

CROSS-REFERENCE TO RELATED APPLICATIONS

This application is a continuation of International Patent Application No. PCT/CN2019/072488 with a filing date of Jan. 19, 2019, designating the United States, now pending, and further claims priority to Chinese Patent Application No. 201810108885.5 with a filing date of Feb. 1, 2018. The content of the aforementioned applications, including any intervening amendments thereto, are incorporated herein by reference.

TECHNICAL FIELD

The present invention relates to the field of Internet/computer technology and refers in particular to a method of processing data.

BACKGROUND TECHNOLOGY

In the current society, many companies and organizations have their own websites, which are used to publish information for customers, and to keep users informed about themselves. However, this kind of website may have a big security risk and can be easily attacked by hackers, which gives hackers an opportunity to access the database of the company's website and cause the leakage of the company's data.

INVENTIONS

It is an object of the present invention to provide a method of processing data that can prevent hackers from obtaining data in an exhaustive manner.

sending, a first data to a first image capturing device, by the first computer, through an image output interface of the first computer; sending, the first data to the second computer, by the first image capturing device. The first data comprises a first information and a second information, the second data comprises a third information and a forth information. The second computer processes the third data or the forth data by a first method if the third information is consistent with the first information and the forth information is consistent with the second information; and the second computer processes the third data or the forth data by a second method if the third information is inconsistent with the first information or the forth information is inconsistent with the second information.

Pros: The invention is effective in reducing the number of hackers using exhaustive methods to obtain data.

ILLUSTRATION OF THE ACCOMPANYING FIGURE

The invention is described in further detail below in connection with the accompanying drawings and embodiments.

FIG. 1 is a flowchart of one embodiment of the method of transmitting data between a first computer and a second computer of the present invention.

ILLUSTRATION OF THE ACCOMPANYING FIGURE MARKERS

Figure 2:
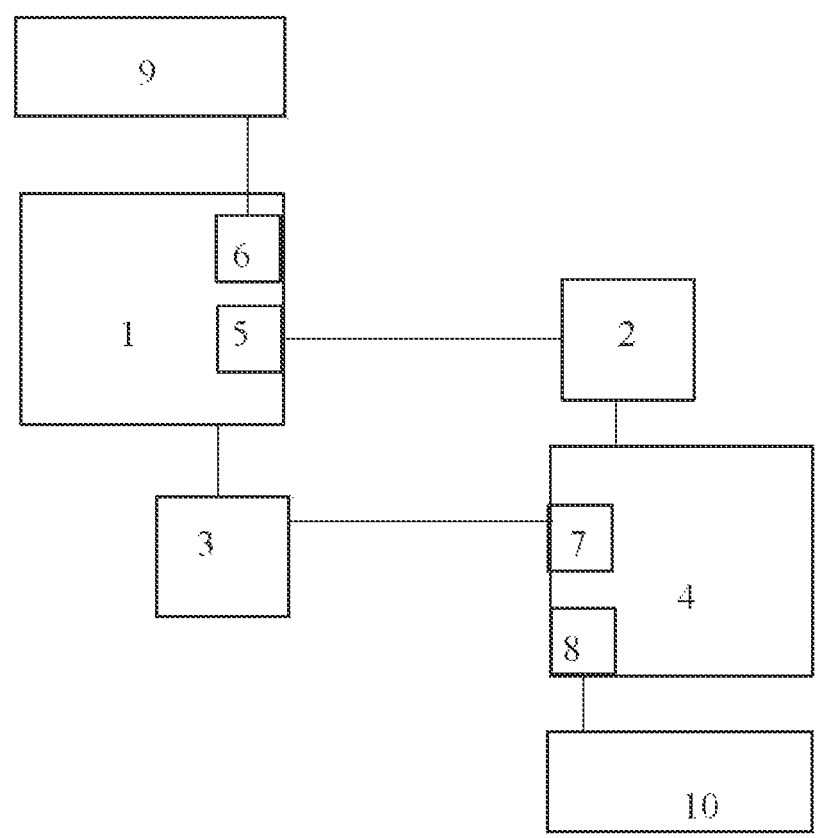
FIG. 2 is a schematic diagram of an embodiment of an apparatus for transmitting data of the present invention.

1. The first computer 2. The first image capturing devic 3. The second image capturing device, 4. The second computer, 5. The first graphics card, 6. The second graphics card 7. The third graphics card 8. The fourth graphics card 9. The first display 10. The second display.

SPECIFIC IMPLEMENTATION MODALITIES

In order to more clearly illustrate the embodiments of the present invention or the technical solutions in the prior art, the following will be described against the accompanying drawings. It is obvious that the drawings in the following description are only some examples of embodiments of the present invention, and it is possible for one of ordinary skill in the art to obtain other drawings and other embodiments based on these drawings without creative labor.

In order to keep the drawings concise, only the parts related to the present invention are shown schematically in each figure, and they do not represent their actual structure as a product. In addition, for simplicity of the drawings for ease of comprehension, parts that have the same structure or function in some of the drawings, only one of which is schematically illustrated, or only one of which is indicated. In this document, "one" not only means "only one", but can also means "more than one".

1. Establishment of a Website:

Database B is installed on the first computer, and the user information of website W is stored in database B. The user information includes user name, password and personal information, and the personal information includes name and phone number. Database B is installed in the second computer 4; the steps for storing user information of website W in database B are described in detail in the subsequent implementation column. NET, JAVA and other development languages or platforms are commonly used by technicians to generate the web pages of the website W. In subsequent examples, program developers can choose different development tools according to their needs.

The first computer is a Web Server; the first computer can also be an Application Server.

An application server can be defined as any of the following.

1) An application server is a computer running at least one set of Server-side applications, one set of Server-side applications can form a corresponding server/client relationship with client applications on other computers or mobile devices.

2) Application server is able to receive Web server data or instructions, and further processing of the data sent to the database server or other computers.

The second computer is a Database Server. The main purpose of a database server is to receive and store data sent by the first computer (web server or application server or other computer).

2. Setting.

(1) The first graphics card 5 and the third graphics card 7 are the same type of graphics card, and the first graphics card 5 and the third graphics card 7 use the same driver.

Initially, neither card 5 nor card 7 will output signals; unless otherwise specified, card 1 will not output the desktop contents of the first computer and card 3 will not output the desktop contents of the second computer.

(2) In the system directory of the first computer and the second computer or in the directory specified by the user, a dynamic link library Rec.dl1 is added to each, the dynamic link library contains the Recpic ( ) function, the function Recpic ( ) may have the function described in detail in the implementation example.

(3) In the example, there is software M, a section of program P (referred to as program P), software F, software K, and other programs in the first computer. The second computer contains software J. The functions of these programs are described in detail in the examples. There are various development languages (tools) or platforms commonly used by developers to write these programs, and developers can choose different development tools as needed.

(4) The first computer sends the image through the video/image output port of the first display card (or the second computer sends the image through the video/image output port of the third display card). The content that is identified in the image contains letters, numbers, text, and symbols, and the height of the content in the image is between 1.5 mm and 40 mm. The background color in the image is white. The color of the content in the image is black. The content has a line spacing of between 1 mm and 15 mm in the image.

It should be noted that after the data in the image sent by the computer via the video/image output port of the graphics card is recognized, it is necessary to eliminate blank lines. It is necessary to first eliminate the blank lines, and the data identified in the image in the example no longer contains blank lines.

5) The first or third graphics card transmits 24 (or 60) images per second. The resolution of the images output from the first graphics card is the same as the resolution of the images captured by the first image acquisition device; the resolution of the images output from the third graphics card is the same as the resolution of the images captured by the second image acquisition device.

6) Please refer to the following table for the format of the data in the images:

TABLE 1

|  | Length (bytes) | Type | Example |
| --- | --- | --- | --- |
| Sequence number | 20 | Integer | 8002 |
| Order type | 30 | Character | "Login" |
| User name | 20 | Character | Zhang |
| Password | 20 | Character | Hello |

As shown in Table I above, for the data format A in the image, it is displayed on the screen.

Figure 3:
FIG. 3 is a first sample of an image of the present invention.

Please refer to FIG. 3.

TABLE 2

|  | Length (bytes) | Type | Example |
| --- | --- | --- | --- |
| Sequence number | 20 | Integer | 8002 |
| The identification of the successful user login | 1 | Character | Y |
| Name | 20 | Character | ZhangSan |
| Telephone | 11 | Character | 13888888888 |

As shown in Table II above, for the data format B in the image, it is displayed on the screen.

Figure 4:
FIG. 4 is a second sample of an image of the present invention.

Please refer to FIG. 4.

TABLE 3

|  | Length (bytes) | Type | Example |
| --- | --- | --- | --- |
| Sequence number | 20 | Integer | 8002 |
| The identification of unsuccessful login | 1 | Character | N |
| Result | 30 | Character | User name and password are mismatched |

As shown in Table III above, for the data format C in the image, it is displayed on the screen. Please refer to FIG. 5.

In one embodiment of the invention.

Settings: The first computer runs a set of Server-side applications, and the business data used by Server-side applications are stored in database B. Server-side applications can receive login requests from application U in the user's mobile phone, and data can be exchanged between Server-side applications and application U in the user's mobile phone.

1. User F opens the user login page of website W, input user name (zhang) and password (hello), and click "Login" button, or, user F opens the application U in his mobile phone, input user name (zhang) and password (hello), and click "Login" button.

2. The first computer runs a program P. A program P is part of an application on the W side of the Web site, or it can be part of an application on the Server side. Program P generates a sequence number, assuming the sequence number is 8002, and the sequence number is incremented, program P puts 8002, "login", user name and password in a frame of image T. A frame of image T is displayed on the screen. The display form of a frame image T on the screen is shown in FIG. 3 (the data format of a frame image T refers to Table 1 above), the image T is saved as 8002.jpg, 8002.jpg is saved in the D:\pic directory of the first computer.

3. the first computer converts the image file 8002.jpg into a signal suitable for transmission from the VGA port of the first graphics card (the first graphics card is considered to be a part of the first computer), and then sends the signal to the first image acquisition device. the signal is sent only once; program P deletes the image file 8002.jpg.

4. Program P scans the D:\recfile directory every second to check whether there is a text file named by a serial number in the directory; in this implementation example, the text file named by a serial number refers to 8002.txt.

5. the first image capturing device receives the image T from the video/image output port of the first display card of the first computer. the first image capturing device stores the image T as 0001.JPG in the memory of the first image capturing device. Then, 0001.JPG is sent to the second computer, or the first image capturing device sends image T to the second computer, and the second computer saves the image as 0001.jpg. In this step, the naming rule of the image file starts from 0001 and increases in order.

6. the second computer saves 0001.jpg in the D:\pic directory of the second computer.

The second computer runs a software J from startup, and software J automatically detects whether there is a new file in D\recpic\ directory.

7. If the second line of the data is "login", the second computer will do the following operations: the third line of the data is read by software J as the user name, the fourth line is the password, software J will read the records in database B and check the user name and password.

A) If the user name and password are matched, the user's personal information is returned, and the personal information is name and phone number. Software J places the first line of the data, the identification of the successful user login, in a frame of the image Y. The display of the image Y on the screen is shown in FIG. 4 (It refers to Table 2 above for the format of the data in a frame Y). The display of Y-frame on the screen is shown in FIG. 4 (It refers to Table 2 above for the format of data in Y-frame). The serial number is stored in the second computer, which forms a set of correspondences with the user name, in other words, this user name has a corresponding serial number at this time.

Figure 5:
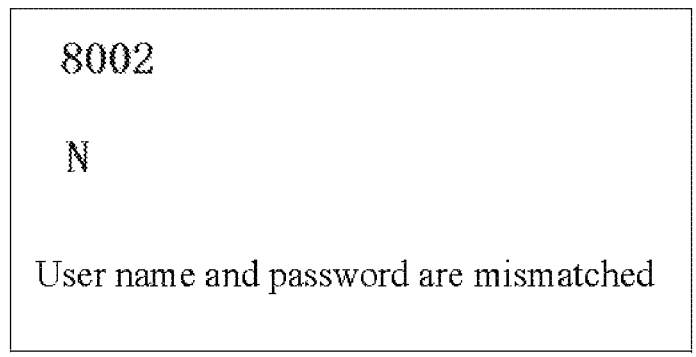
FIG. 5 is a third sample of an image in the present invention.

B) If the user name and password are mismatched, it returns "User name and password are mismatched", the software J will put the data of the first line, the identification of unsuccessful login and "User name and password are mismatched" in a frame of image Y. The display form of a frame of image Y on the screen is shown in FIG. 5 (It refers to the data format of a frame of image Y in Table 3 above).

8. The second computer converts the image Y into an image signal suitable for the transmission from the VGA port of the third graphics card (the third graphics card is considered to be a part of the second computer), and then sends the image signal to the second image acquisition device, which is sent only once.

9. After the second image capturing device receives the image Y from the image/video output port of the third graphics card in the second computer, the second image capturing device saves the image Y as R0001.JPG. The second image capturing device then sends R0001.JPG to the first computer, or the second image capturing device sends the image Y to the first computer. The first computer saves the image Y as R0001.JPG. In this step, the image file's filename naming convention is "R"+the file number, which starts from 0001 and increases sequentially.

10. The first computer stores R0001.JPG in the D:\recpic\ directory of the first computer. The first computer runs a software M from startup, which automatically monitors the D\:recpic\ directory for new files. When Software M monitors the D\recpic\ directory for the presence of a new file R0001.JPG, Software M recognizes and retrieves the data on R0001.JPG. The data includes information on whether the user login was successful or unsuccessful, such as the message "The user name and password are mismatched". If the number in the first line of the data is 8002, Software M saves the data as 8002.txt, 8002.txt is saved in the D:\recfile directory. Software M deletes R0001.JPG from the first computer.

The program P finds 8002.txt in the D:\recfile directory, and the first computer also does the following:

If the number in the first line of the data is 8002, the first computer also performs the following operations:

1) If the letter in the second line of 8002.txt is "Y", the user F's computer display or the phone's application shows "Successful User Login".

2) If the letter in the second line of 8002.txt is "N", the first computer sends "User name already exists or the password entered twice is not the same" to the user F's computer or phone. The display of user F's computer or the application of the mobile phone shows "The user name and password are mismatched".

3) The program P removes 8002.txt from the first computer.

11. the user clicks the "View User Information" button on his computer, the first computer puts the serial number, "query", user name and other information on the first line, second line, third line in the picture Q, and then sends the picture Q to the second computer.

12. The second computer identifies the data in image Q. If the second line is "Query", then it reads out the user name stored in the second computer and its corresponding serial number.

(1) If the user name stored in picture Q is found in the second computer and the serial number corresponding to the user name is the same as the serial number in picture Q, then the customer information and serial number related to this user name are placed in picture w, and the second computer sends picture w to the first computer.

(2) Otherwise, "Your access is out of specification" is placed in image w, and the second computer sends image w to the first computer.

13. the first computer sends the information in the image w to the user's computer. In another embodiment of the invention, a further requirement for the hardware is that the first image capture device is an image capturing card that is installed in the second computer.

The second image capturing device is an image capturing card that is installed in the first computer.

1, The user F opens the website W's user login page, inserts the user name, password, and clicks the "login" button.

2. The first computer runs a program P, which generates a serial number, the range of the serial number is 5000 to 65535. if the generated serial number is greater than 65535, the serial number is equal to 5000, and the serial number will increase in sequence. Let's assume that the generated session number is 8002, or the program P is ran to get the session number of the web page opened by user F. The session number can also be replaced by the said session number (hereinafter referred to as session number). The program P places 8002, "login", user name "Zhang" and password "hello" in a frame of the image X. The display of a frame of the image X on the screen is described in FIG. 3 (see Table 1 for the data format of a frame of the image X).

3. The first computer converts the image X into a signal suitable for the VGA port transmission of the first graphics card (the first graphics card is considered to be an integral part of the first computer), and then sends the signal to the first image capturing device, and the signal is sent only once.

4. The program P runs a socket server-side program and a socket receiver-side (server-side) program to receive data, and a socket receiver-side program uses socket port number 8002.

5. the first image capturing device captures (receives) the image X from the video/image output port of the first graphics card of the first computer.

The driver of the first image capturing device calls the function Recpic( ) in the dynamic link library Rec.d11 in the second computer, and the driver of the first image capturing device passes image X to the function Recpic( ).

6. the function Recpic( ) in Rec.d11 in the second computer runs an image recognition program. It recognizes the data in image X. The second computer performs the following operations:

If the function Recpic( ) in Rec.d11 in the second computer determines that the second line of data "login", the function Recpic( ) in Rec.d11 in the second computer reads the third line of data as the user name. Its fourth line is used as password. The function Recpic( ) in Rec.d11 in the second computer reads the record in database B and checks the user name and password.

A) If the user name and password are matched, the information of successful user login is returned. The function Recpic( ) in Rec.dll in the second computer puts the serial number and the identification of successful user login in one frame of image S. In image S, the first line is the serial number (or session number) and the second line is "Y". The serial number (or session number) is stored in the second computer, which forms a set of correspondences with the username, in other words, this username has a corresponding serial number (or session number).

B) If user name and password are mismatched, then return "User name and password are mismatched". The function Recpic( ) in Rec.dll in the second computer puts the serial number, the mark of unsuccessful login and the "username and password are mismatched" in one frame of image S. The form of its display on the screen is shown in FIG. 5 (It refers to Table 3 above for the format of data in one frame of image S).

7. A second computer (the third graphics card is considered to be a component of the second computer) converts this image S into a signal suitable on the VGA port transmission of the third graphics card, and then sends the signal to the second image capturing device by sending the signal only once.

8. The second image capturing device captures (receives) the image S from the video/image output port of the third graphics card of the second computer.

The driver of the second image capturing device calls the function Recpic( ) in Rec.dll in the first computer. The function Recpic( ) in Rec.dll in the first computer runs an image recognition program to identify and acquire the data in image S;

If the number in the first line of the data is 8002, then the function Recpic( ) in Rec.dll in the first computer runs a segment of the socket-sender program (client program). A segment of the socket-sender program sends out the data that has been identified in the image. A segment of the socket-sender program uses the socket communication port number 8002.

9. The software P in the first computer receives the data, and the first computer also performs the following operations.

(1) If the second line of the data is "Y", the first computer sends the message of successful user login to the user F's computer, and "Successful user login" is displayed on the display of user F's computer.

(2) If the second line in the data is "N", the first computer sends "The user name already exists or the password entered twice is not the same" to the user F's computer, and the user F's computer displays "The user name and password do not match" on the display.

The user F clicks the "View User Information" button on his computer, and the first computer puts the serial number (or session number), "query", user name and other information on the first, second and third lines of the picture Q, and then sends the picture Q to the second computer.

10. The second computer recognizes the data in picture Q. If the second line is "Query", then read out the user name that is stored in the second computer and its corresponding serial number (or session number).

(1) If the user name stored in Image Q is found in the second computer, and the serial number (or session number) of the user name is the same as the serial number (or session number) in Image Q, then the customer information and serial number (or session number) associated with the user name are placed in Image w, and the second computer sends Image w to the first computer.

(2) Otherwise, "Your access is out of specification" is placed in image w, and the second computer sends the image w to the first computer.

11. the first computer sends the information in the picture w to the user's computer.

It should be noted that in any of the above embodiments:

The output port of the display card can be an image output port such as DVI, HDMI, etc. The input port of its corresponding image capture device also uses the corresponding image input port. And the first computer converts the relevant image/image file into a signal suitable for transmission from the output port of the first display card such as DVI or HDMI; the second computer converts the relevant image/image file into a signal suitable for transmission from the output port of the third display card such as DVI or HDMI.

Any device that is capable of obtaining data from the first computer and capable of sending image signals to the image acquisition device should be considered an alternative to the graphics card. The user may perform a variety of operations using the techniques in the above examples of implementation.

In another embodiment of the invention, as shown in FIG. 1. A data processing method for transmitting data between a first computer and a second computer, comprising:

S10: Sending, a first data to a first image capturing device, by the first computer, through an image output interface of the first computer; sending, the first data to the second computer, by the first image capturing device; or processing the first data, by the first image capturing device, and generating a second data; and sending the second data, by the first image capturing device, to the second computer;

Wherein the first image capturing device has an image input interface configured to be communicated with the image output interface of the first computer; the first data comprises a first information and a second information; the image output interface of the first computer comprises an output interface of a graphics card of the first computer;

S20: Sending, a third data to the first image capturing device, by the first computer, through the image output interface of the first computer after the first data or the second data is processed by the second computer; and sending, the third data, by the first image capturing device, to the second computer by the first image capturing device; or processing the third data, by the first image capturing device, and generating a forth data; and sending the forth data, by the first image capturing device, to the second computer;

S30: The third data or the forth data comprises a third information and a forth information; the second computer processes the third data or the forth data by a first method if the third information is consistent with the first information and the forth information is consistent with the second information; and the second computer processes the third data or the forth data by a second method if the third information is inconsistent with the first information or the forth information is inconsistent with the second information.

It should be noted that all of the above embodiments are free to be combined as desired.

The foregoing are only preferred embodiments of the present invention. It should be noted that for persons of ordinary skill in the field of the technology. Without departing from the principles of the invention, a number of improvements and embellishments may also be made, which should also be considered as the scope of protection of the invention.

I claim:

1. A data processing method for transmitting data between a first computer and a second computer, comprising:

sending, a first data to a first image capturing device, by the first computer, through an image output interface of the first computer;

sending, the first data to the second computer, by the first image capturing device; or processing the first data, by the first image capturing device, and generating a second data; and sending the second data, by the first image capturing device, to the second computer;

sending, a third data to the first image capturing device, by the first computer, through the image output interface of the first computer after the first data or the second data is processed by the second computer; and sending, the third data, by the first image capturing device, to the second computer by the first image capturing device; or processing the third data, by the first image capturing device, and generating a fourth data; and sending the fourth data, by the first image capturing device, to the second computer;

wherein the first image capturing device has an image input interface configured to be communicated with the image output interface of the first computer;

the first data comprises a first information and a second information;

the image output interface of the first computer comprises an output interface of a display card of the first computer; and the third data or the forth data comprises a third information and a fourth information; the second computer process the third data or the forth data by a first method if the third information is consistent with the first information and the forth information is consistent with the second information; and the second computer processes the third data or the forth data by a second method if the third information is inconsistent with the first information and the forth information is inconsistent with the second information; wherein the first method allows the second computer to send a first query result to a second image capturing device, and the second image capturing device sends the first query result to the first computer; the second method allows the second computer to send a second query result to the second image capturing device, the second image capturing device send the second query result to the first computer.

2. The data processing method of claim 1, wherein the first computer is a Web server or an application server.

3. The data processing method of claim 1, wherein the second computer is a database server.

4. The data processing method of claim 1, wherein the first information refers to a first user name stored in the first data; the second information refers to a first session number stored in the first data;

the third information refers to a second user name stored in the third data or the fourth data; the fourth information refers to a second session number stored in the third data or the fourth data.

5. The data processing method of claim 1, wherein the first query result comprises the second information and a customer information; and the second query result comprises an identification of access denied.

* * * * *